United States Patent
Kim et al.

(10) Patent No.: US 7,372,470 B2
(45) Date of Patent: May 13, 2008

(54) SYSTEM AND METHOD FOR TRANSMITTING AND DISPLAYING MESSAGES IN A MOBILE TERMINAL

(75) Inventors: Young Hoon Kim, Kyonggi-do (KR); O Seong Kweon, Seoul (KR); Ka Eun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 468 days.

(21) Appl. No.: 10/306,104

(22) Filed: Nov. 27, 2002

(65) Prior Publication Data
US 2003/0125055 A1    Jul. 3, 2003

(30) Foreign Application Priority Data
Nov. 29, 2001  (KR)  ............... 2001-74947
Nov. 29, 2001  (KR)  ............... 2001-74948

(51) Int. Cl.
G09G 5/02 (2006.01)

(52) U.S. Cl. ............ 345/593; 345/2.1; 345/2.3; 345/589; 345/594; 345/601; 455/412.1; 455/466; 715/864

(58) Field of Classification Search ............... 345/2.1, 345/2.3, 594; 455/412.1, 466; 340/7.43
See application file for complete search history.

(56) References Cited

U.S. PATENT DOCUMENTS

| | | | | |
|---|---|---|---|---|
| 5,784,001 A * | 7/1998 | Deluca et al. | ............ | 340/7.56 |
| 6,044,248 A * | 3/2000 | Mochizuki et al. | ........ | 340/7.47 |
| 6,304,898 B1 * | 10/2001 | Shiigi | ............ | 709/206 |
| 6,320,595 B1 * | 11/2001 | Simons et al. | ............ | 345/619 |
| 6,333,973 B1 * | 12/2001 | Smith et al. | ............ | 379/88.12 |
| 6,523,046 B2 * | 2/2003 | Liu et al. | ............ | 707/104.1 |
| 6,628,971 B1 * | 9/2003 | Yoon et al. | ............ | 455/566 |
| 6,810,262 B2 * | 10/2004 | Kim | ............ | 455/466 |
| 6,908,389 B1 * | 6/2005 | Puskala | ............ | 463/40 |
| 6,965,926 B1 * | 11/2005 | Shapiro et al. | ............ | 709/219 |
| 2003/0069004 A1 * | 4/2003 | Hamynen et al. | ............ | 455/412 |
| 2005/0027802 A1 * | 2/2005 | Madsen et al. | ............ | 709/204 |

FOREIGN PATENT DOCUMENTS

WO    WO03001770    *    1/2003

OTHER PUBLICATIONS

3rd Generation Partnership Project; Technical Specification Group Terminals; Technical Realization of the Short Message Service (SMS), Point-to-Point (PP), (3G TS 23.040 version 2.0.0), Jun. 1999.*

"HTML 4.01 Specification" W3C Recommendation Accessed via web (http://www.w3.org/TR/html401/) on Aug. 29, 2007. Date published Dec. 18, 1997. Sections 6, 7 & 15.*

* cited by examiner

Primary Examiner—Kee M. Tung
Assistant Examiner—Antonio A Caschera
(74) Attorney, Agent, or Firm—Lee, Hong, Degerman, Kang & Schmadeka

(57) ABSTRACT

A method and system for transmitting and displaying messages in a mobile terminal using short messaging service (SMS) is disclosed. An SMS message having a primary format information is encoded with a secondary format information, wherein the primary and secondary formats define attributes of the message such as foreground, background, and text color or images.

45 Claims, 7 Drawing Sheets

FIG. 6A color mobile terminal according to the present invention

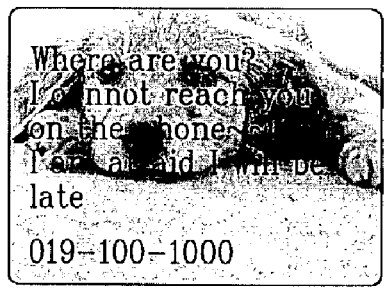

A insert format information and transmit message conventional color mobile terminal looking at message Where are you?
I cannot reach you
on the phone~~
I am afraid I will be late
019-100-1000 color mobile terminal according to the present invention

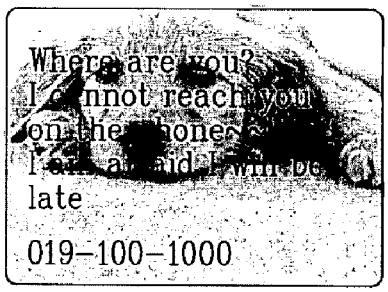

B insert format information and transmit message color mobile terminal according to the present invention

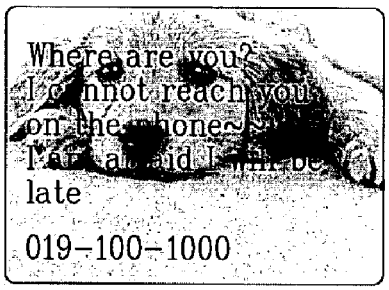

color mobile terminal according to the present invention

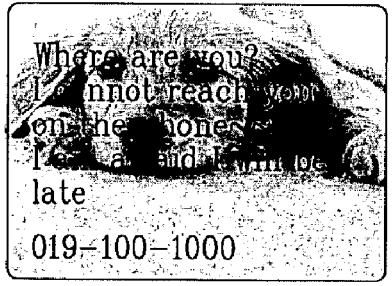

C format information is not inserted color mobile terminal according to the present invention

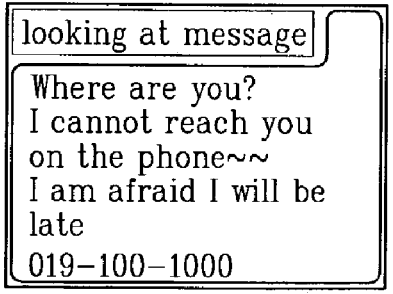

looking at message

Where are you?
I cannot reach you
on the phone~~
I am afraid I will be late
019-100-1000

FIG. 6B color mobile terminal according to the present invention

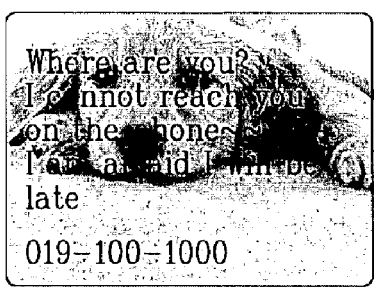

D insert information for setting display of characters, numbers, and signs forming message color mobile terminal according to the present invention

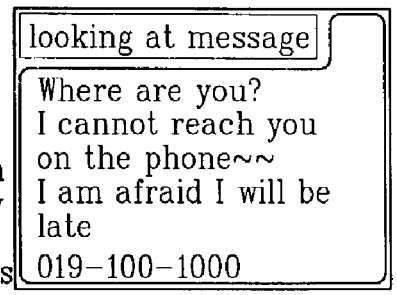

color mobile terminal according to the present invention

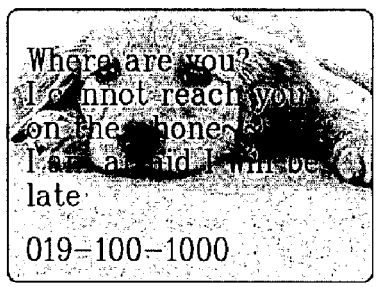

E insert setting information of background color mobile terminal according to the present invention

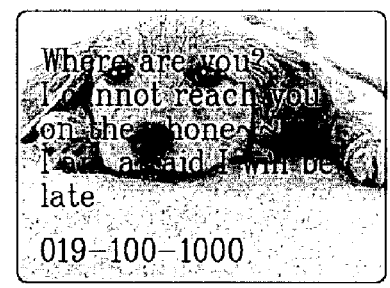

color mobile terminal according to the present invention

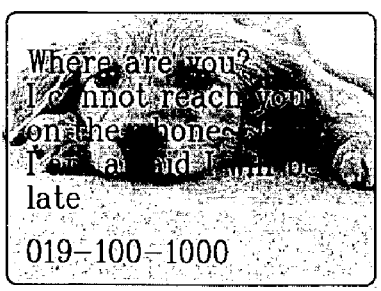

F insert setting information of background and color of background color mobile terminal according to the present invention

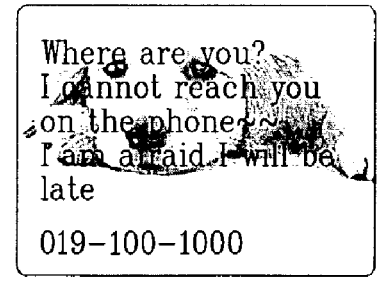

SYSTEM AND METHOD FOR TRANSMITTING AND DISPLAYING MESSAGES IN A MOBILE TERMINAL

CROSS REFERENCE TO RELATED APPLICATION

Pursuant to 35 U.S.C. § 119(a), this application claims the benefit of earlier filing date and right of priority to Korean Patent Application Nos. 2001-74947 and 2001-74948, both filed on Nov. 29, 2001.

BACKGROUND OF THE INVENTION

1. Field of the Invention

The present invention relates to a mobile communication service and terminal and, more particularly, to a method of transmitting and displaying messages in a mobile terminal.

2. Discussion of the Related Art

Generally, a mobile communication system provides a voice call service, a short messaging service (SMS), and a wireless Internet service. The voice call service is most common and essential. Using the message forwarding service, a short text message may be created and transmitted from one mobile user to another.

Some of the characteristics of the SMS include: maximum 160 characters message length, similar functionality as those of a bi-directional radio calling service, a voice call box service, a short message transmitting and receiving service, a live information service, and an information service on demand. The live information service uses a single directional communication concept. The information service on demand transmits and receives continuous messages. A SMS can be delay transmitted. That is, if a recipient mobile terminal is turned off or outside a viable service area or range, the transmitted messages are queued in a message center and are forwarded later when the receiving mobile terminal is turned on or is within service range.

The SMS service is different from a voice messaging service in the following manners. The voice call box service uses voice input and output mechanisms. The SMS service and the wireless Internet service, however, are provided via the display of the mobile terminal. A black-and-white liquid crystal display (LCD), if any, is typically utilized in a conventional technology associated with a voice messaging service. A color LCD or a color display with organic electroluminescence (EL) can also be utilized.

SMS messages transmitted using a mobile terminal with a black-and-white or color display are displayed on a receiving mobile terminal through the message receiving function based on a defined standard adopted for displaying black and white text messages on the mobile terminals display unit. Unfortunately, the current MSM standard does not provide the capability to take full advantage of the display features provided in a color display unit. That is, a message displayed on a color display using the conventional SMS technology is in a standard color and background format, even though the color display has the display capability to display the message in more than one color and background format.

It is desirable for a user or receiver of a message to be able to customize the SMS options so that the transmitted or received text is displayed in a color or format of choice, as directed by the user. A method for transmitting and displaying messages is needed that enables a user to transmit and receive messages of unique colors and formats.

SUMMARY OF THE INVENTION

The present invention is directed to method and system of transmitting and displaying messages in a mobile terminal.

Additional features and advantages of the invention will be set forth in the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method and system for constructing a message using short messaging service (SMS) comprises the step of encoding an SMS message having a first format information with a second format information, wherein the first format information defines attributes associated with the manner in which the message is displayed on a monochrome display. In addition, the second format information defines attributes associated with the manner in which the message is displayed on a color display, such that if the message is received by a system equipped with a color display the message is displayed in accordance with the second format instead of the first format.

According to some aspects of the present invention, the message may comprise of a background and a foreground. The second format may define attributes associated with the message's background or foreground. The attributes associated with the message's background may define an image or background color. The attributes associated with the message's foreground may define the color or format of the text included in the message.

According to others aspects of the present invention, the method may further comprise the step of encoding the SMS message with a format code indicating whether the SMS message is encoded with the second format information. The format code may be used by a system to determine if the message can be displayed according to attributes of the second format.

According to other aspects of the present invention, SMS message may be forwarded in a communication packet having a call-back number or user data field, wherein the method would further comprise the step of inserting the second format information, the format code or the SMS message into the call-back number or user data fields. In addition, the SMS message may be converted into and decoded from ASCII code.

According to another aspect of the present invention, a method of displaying the SMS message is included, wherein the message is determined to be encoded with the second format information, and displayed in accordance with the second format.

According to another aspect of the present invention, a method of displaying the SMS message may further comprise the process of automatically changing the image or foreground, background or text color to provide a contrast between the message's foreground and background, if the message's foreground and background color and format are such that the message cannot be clearly displayed. With respect to this aspect, the second format defines attributes associated with the message's foreground and background color and format.

BRIEF DESCRIPTION OF THE DRAWINGS

The accompanying drawings, which are included to provide a further understanding of the invention and are incor

FIGS. 6A-6B illustrate various examples of SMS messages displayed according to one or more aspects of the present invention.

Reference will now be made in detail to the one or more embodiments of the present invention, examples of which are illustrated in the accompanying drawings. Where possible, the same reference numbers are used throughout the drawings to refer to the same or like parts.

DETAILED DESCRIPTION OF THE INVENTION

The present invention is directed to a method for transmitting and displaying messages in mobile terminal. In the following, the invention is described, by way of example, as applied to short messaging service (SMS). It should be noted, however, that in other embodiments same principals may be applied to other messaging services displayable on other embedded systems and terminals.

Figure 1:
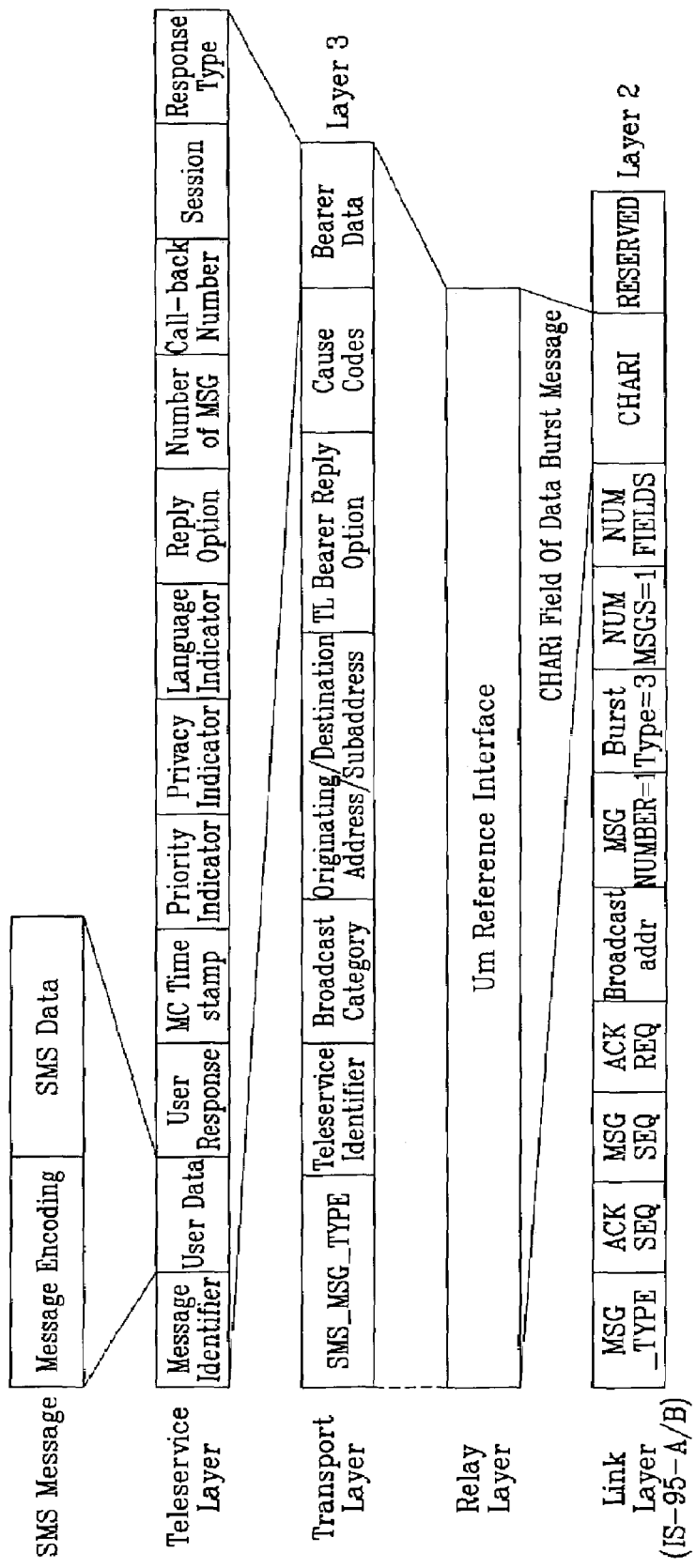
- FIG. 1 is a block diagram illustrating a transmission packet structure for a short message service (SMS), in accordance with one embodiment of the invention.
Figure 2:
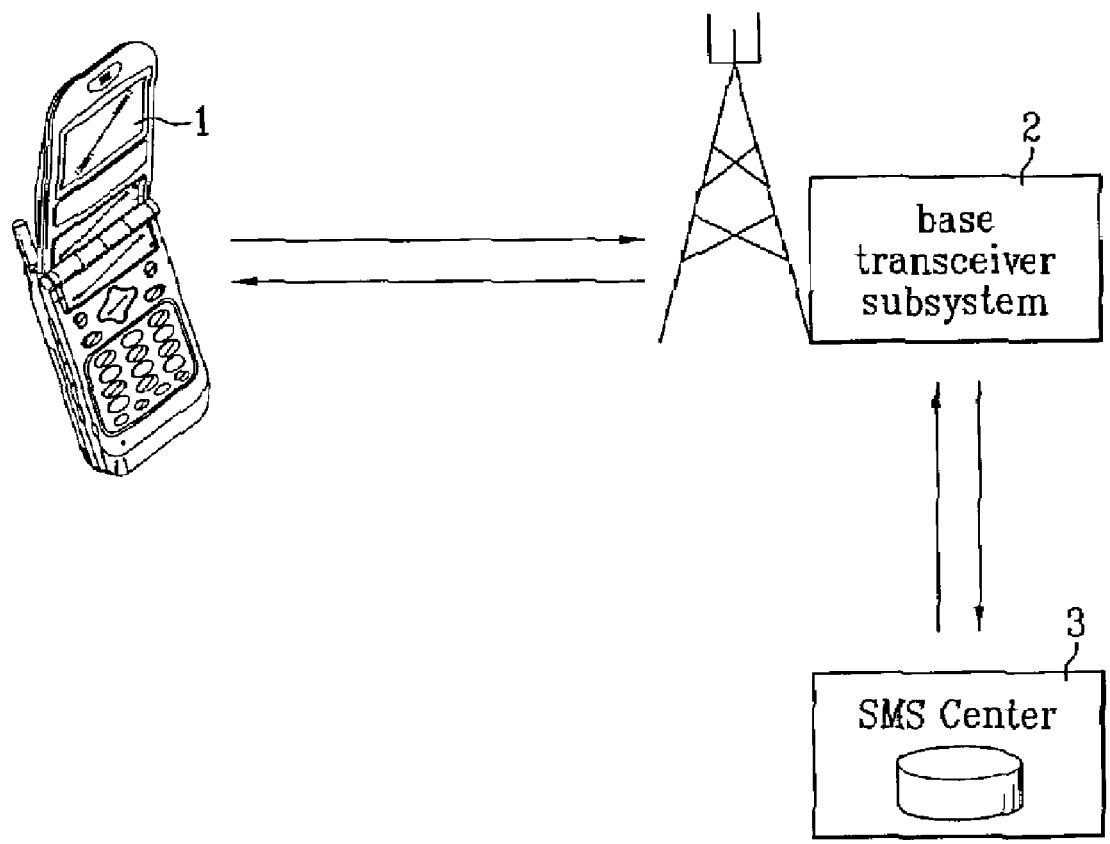
FIG. 2 is a diagram illustrating a message transmission system for the SMS, in accordance with one embodiment.

Referring to FIGS. 1 and 2, exemplary protocol layers utilized for transmission of a SMS message comprise: a link layer, a relay layer, a transport layer, and a teleservice layer. The link layer is a protocol for facilitating communication between a mobile terminal 1, according to the IS-95 specification, for example, and a base transceiver subsystem 2. A message format created by a transport layer is inserted into a "CHARi" field of the link layer and is transmitted via radio.

In some embodiments, a relay layer is not applied to the SMS service. That is, the SMS message format created by the transport layer is bypassed through the relay layer. The transport layer is a protocol utilized between the mobile terminal 1 and the SMS center (SMSC) 3. In the transport layer, a message format created by a teleservice layer is inserted into a bearer data field and is sent to the relay layer.

In the teleservice layer, a communication packet comprises a message, a call-back number, and a priority indicator that are provided by the user of the mobile terminal 1. The packet is transmitted to the transport layer. The packet also includes a user data field that includes a SMS message. In one embodiment, a SMS message format formed of a SMS data field and a message encoding field is inserted into the user data field of a teleservice layer packet. The actual user message is included in the SMS data field. Encoding information of the SMS data is included in the message encoding field.

The user data field and the call-back number field of the teleservice layer are used so that a communication service entrepreneur or a terminal manufacturing enterprise can, for example, partially control the internal specification of the call-back number. In accordance with one aspect of the invention, the user data field indicates whether format information is inserted in a message. The data field may contain 1 to 2 bytes of format information, for example. Various information items may be inserted into the call-back number field and forwarded thereby to the transport layer. For example, in one embodiment, a format function for indicating format information can be inserted into the call-back number field. The format function may be formed of codes including various format information items, such as background images, foreground and background color, or formatting attributes for text included in a SMS message.

The format information can be stored in the internal memory of the mobile terminal. The format information may include a color code to indicate, for example, the luminance and/or the chromaticity values of three primary colors (RGB) of a display pixel. The chromaticity value is determined by a hue value and a saturation value. Therefore, the chromaticity value determines the color generated by the combination of the three primary colors.

In another embodiment, the color code is formed of codes showing a plurality of colors such as red, blue, yellow, green, and purple. In this embodiment, a color table including the colors shown by the respective codes is stored in memory. When a user wants to select a specific color, a color table, for example, is displayed. When the user selects the specific color from the table, the code value of the selected color is inserted into the call-back number field and is transmitted.

Format information may comprise an image code indicating the address of a memory region, in which images to be used in the background are stored. As a result, the format function is used to indicate the background stored in the specific address of the memory, according to the color code value, and determines the display attributes of the received message. In some embodiments, the color code indicates the respective sectors of the background displayed in different colors. Also, the format function is used to indicate the color of the text message (i.e., a combination of characters, signs, and numbers) inserted into the user data field, according to a color code value. As such, respective characters of a message may be displayed in different colors, according to an indicated color code. In some embodiments, a code for indicating whether an image is inserted along with a text message can be inserted into call-back number field rather than the user data field.

In accordance with one aspect of the invention, application software for composing a SMS message and configuring the display type of the message may be executed on the mobile terminal 1. Mobile terminal 1 includes a plurality of keys, which can be manipulated by a user to compose and transmit a series of messages, and a transmitter for forwarding the message and display information. According to the present invention, the application software may be also implemented in the form of hardware, firmware or a combination of hardware and software for execution on the mobile terminal 1.

We will refer to this application software as the message forwarding program. The message forwarding program, in accordance with one or more embodiments, has a background selection function, a message input function, a character color selection function, a background color selection function, a function for automatically setting the color of characters contrasting with the color of a background, and a message transmission function.

In some embodiments, the mobile terminal 1 includes a receiver for receiving a SMS message, a controller for determining whether format information is inserted into the received message, and a display for displaying the SMS message. The mobile terminal 1 may further include memory for temporarily storing a composed SMS message or a received SMS message and a lookup table for setting the display type of the message stored in the memory.

The lookup table stored in the memory may be used to configure the message for display according to the image function inserted into the received message. The lookup table includes, for example, a plurality of background images, a plurality of color codes for determining the background color, and color codes to determine the color of the characters, numbers and symbols forming the message. As such, the format function determines the image code and the color codes of a specific background with reference to the lookup table. A user may select a color code to indicate the color of the background and another color code to indicate the color of the characters, numbers and symbols forming the message.

The mobile terminal, according to one embodiment of the present invention uses a 2-byte ASCII code for supporting a monochrome display and a 4-byte ASCII code for supporting a color display, for example. In certain embodiments, a composed SMS message in monochrome or black-and-white is converted into a 4-byte ASCII code, for example, and is displayed in color. The converted SMS message is temporarily stored in an internal memory of the mobile terminal. In accordance with one aspect of the invention, the 4-byte ASCII code may be converted into a 2-byte ASCII code, for example, for transmission efficiency.

Figure 3:
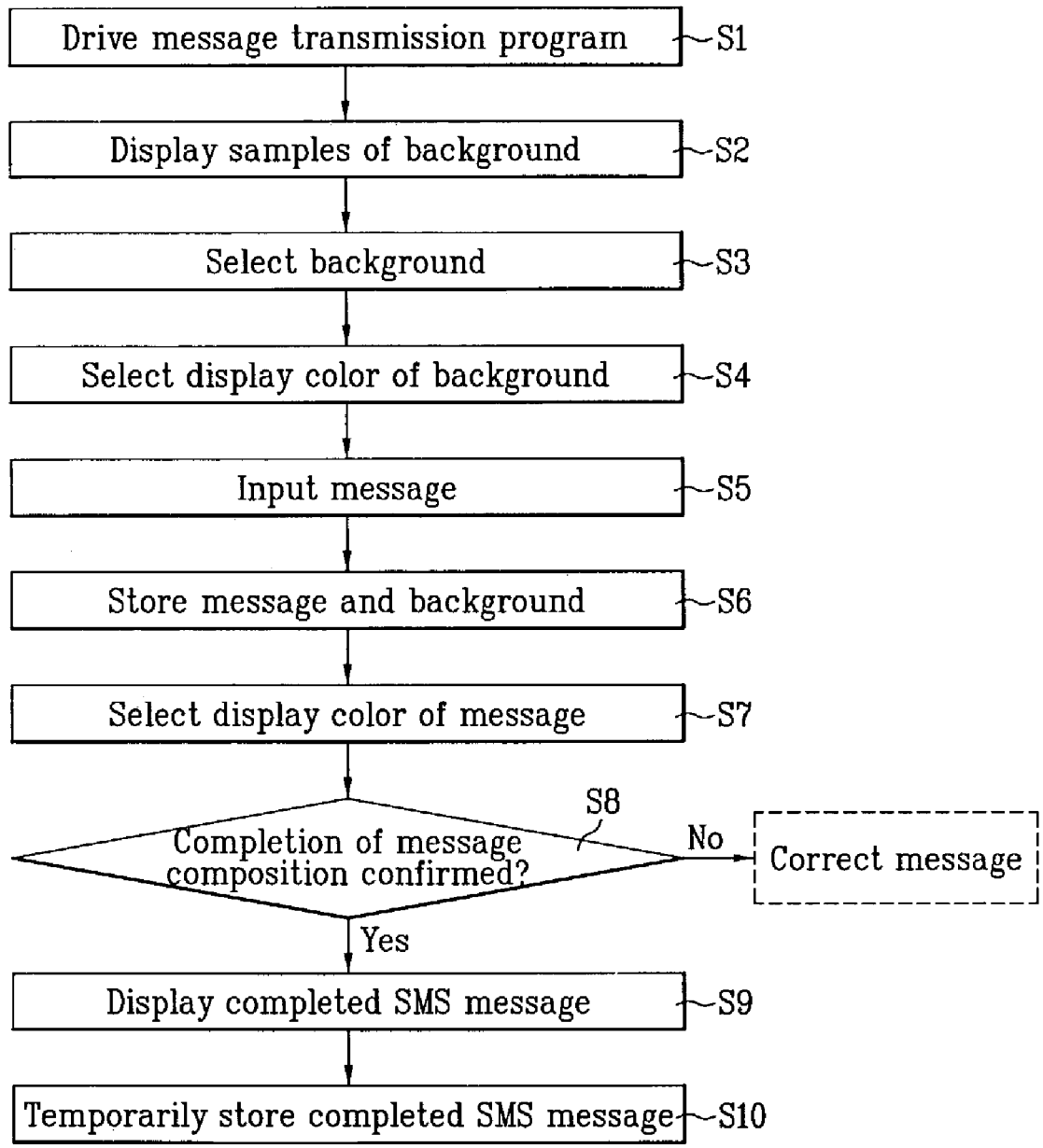
FIG. 3 is a flow diagram illustrating a message composition procedure according to one embodiment of the present invention.

FIG. 3 shows a message composition procedure according to one embodiment of the present invention. Referring to FIG. 3, a message forwarding program is built into the mobile terminal and can be driven by a user manipulating a specific key, for example (at state S1). User manipulation of the mobile terminal may be accomplished in various manners (e.g., key press, touch screen, voice activation, etc.), as appreciated by a person of ordinary skill in the art. The message forwarding program is used to compose the SMS message and for setting the display type of the message.

When the background selection function of the forwarding program is executed, previously stored background samples are displayed so that a user can select a specific background (at state S2). Thereafter, the background is selected by the user (at state S3). The display color of the selected background is then selected through the background selection function (at state S4). Exemplary backgrounds may include a heart or a rose (i.e., for love), a ship, an airplane, or mountain-climbing boots (i.e., travel), and hamburger, coffee, or pizza (i.e., food). Such backgrounds can be stored in the terminal's memory when the terminal is manufactured and may be downloaded and updated via the Internet, for example.

The user can input the SMS message using an input function of the forwarding program (at state S5) after the background is selected. The input message is then temporarily stored in the internal memory together with the selected background (at state S6).

The user may select the display colors of the message's textual foreground, such as characters, signs, and numbers, through the character color selection function of the forwarding program (at state S7). In some embodiments, when the user inputs the text message on the background, the terminal automatically converts the color of the input characters into a color that is in contrast with the color of the background for better viewing, if needed. More specifically, the terminal automatically converts the color of the input characters into a color having much higher or lower brightness than the color of the background or into a color that is complementary to or reverse of the color of the background.

In some embodiments, the color conversion is performed one character at a time. That is, the color of an inputted character is converted into a color contrasting with the background as soon as it is entered. In other embodiments, the color conversion takes place after one line or after the entire message is completed. The user confirms whether composition of the message is completed (at state S8). Thereafter, the completed SMS message is displayed on the display window (the color LCD or the organic EL) (at state S9).

The composed message is then temporarily stored in the internal memory (at state S10). Then, the previously and temporarily stored messages and the memory address of the selected background are deleted. For the temporarily stored messages, the messages and the format information are separately stored so that the message and the format information may be distinguished from each other. In certain embodiments, a user determines whether the displayed message is transmitted as it is or whether the message is to be formatted in accordance with the format information.

In certain embodiments, the various steps of selecting the background image and color, and display color of the text, which are performed during the composition of a message, can be performed in different orders depending on implementation. Thus, the order of said actions is exemplary and not of particular importance unless indicated otherwise.

Figure 4:
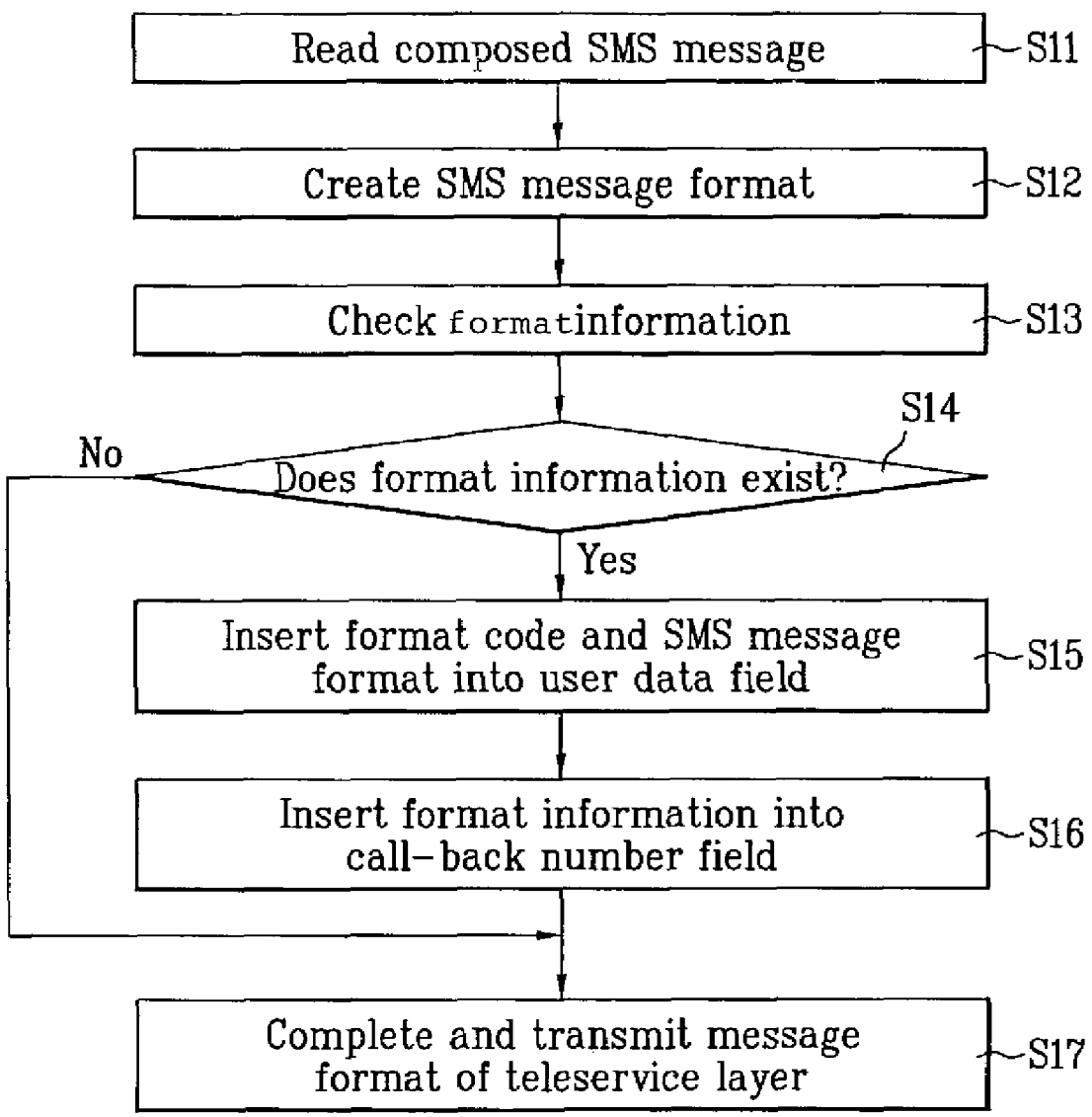
FIG. 4 is a flow diagram illustrating a message transmission procedure according to one embodiment of the present invention.

Referring to FIG. 4, the SMS message composed by the user is read from the internal memory (at state S11). The SMS message format is created by inserting the message entered by the user into the SMS data field and by inserting the primary format information of the SMS message into the message encoding fields (at state S12).

At state S13, secondary format information such as the background image and color, and the display color of the text forming the message, are examined. At step S14, the existence of format information for the SMS message to be transmitted is determined. If so, a code indicating that format information is present is inserted into the user data field of the teleservice layer together with the SMS message format (at state S15). In some embodiments, when the format information for the SMS message is found, the code value for indicating whether the format information is inserted is automatically added to the SMS message format and is thereafter inserted into the user data field.

The format information items previously stored in the call-back number field of the teleservice layer, such as the background and text colors are also inserted (at state S16). The message format of the teleservice layer is completed and transmitted to the receiver (at state S17).

Referring to state S14, if secondary format information for the SMS message does not exist, the message format of the teleservice layer is completed and is transmitted to the receiver. As such, the message is displayed on the receiver mobile terminal in its primary format.

Figure 5:
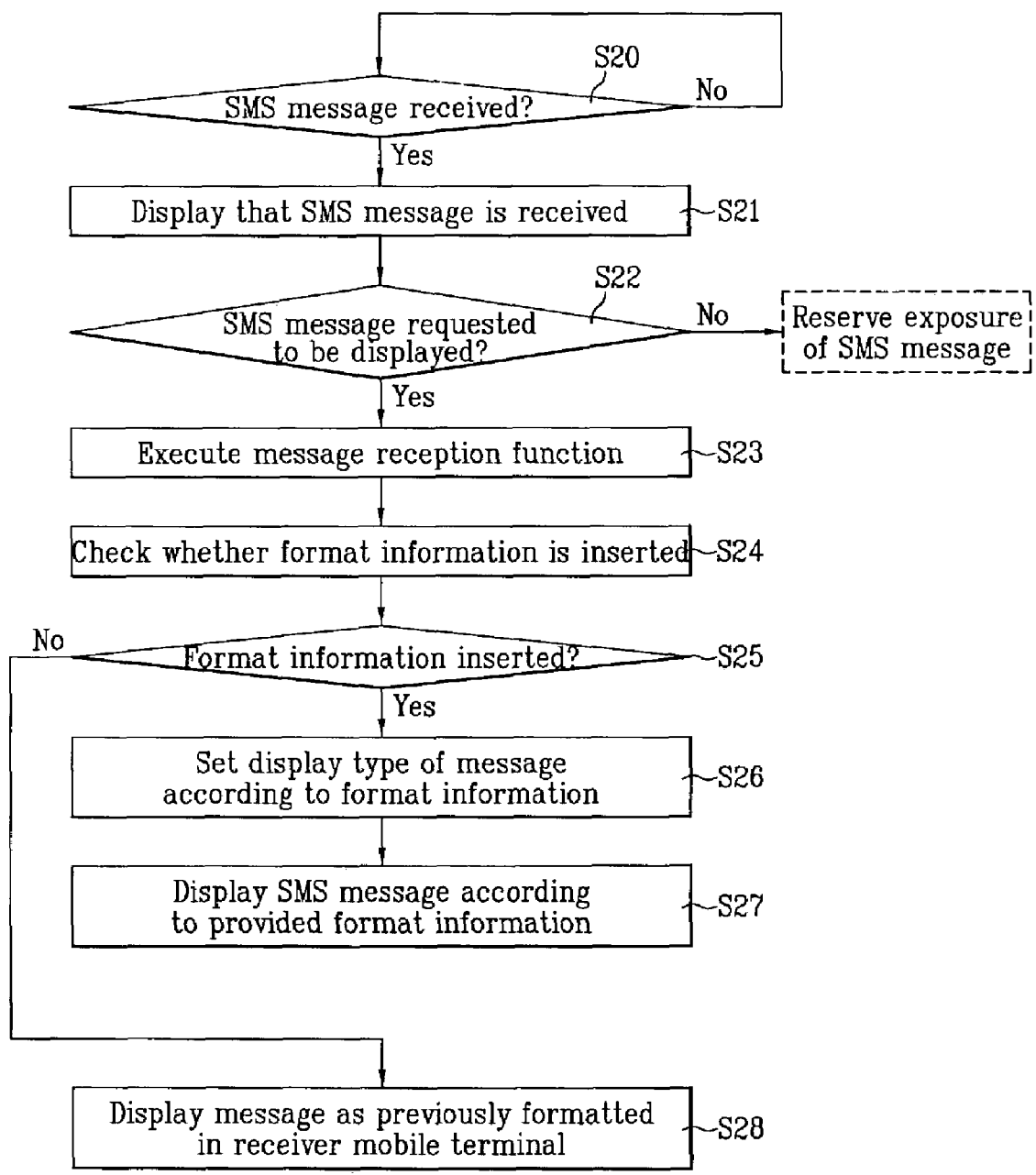
FIG. 5 is a flow diagram illustrating a message display procedure according to one embodiment of the present invention.

Referring to FIG. 5, when an SMS message is received in a receiver mobile terminal (at state S20), the reception of the SMS message is indicated via an on screen display (OSD) (at state S21). If the user requests that the received SMS message to be displayed (at state S22), the message reception function of the message transmission program is executed (at state S23). Before displaying the SMS message, it is determined whether secondary format information is included in the received message by examining, for example, the user data field of the teleservice layer (at state S24). This determination can be made, for example, by checking a format code (i.e., a format flag) inserted in the message. If it is determined that the format information is inserted (at state S25), the message is configured with reference to the format information or the format function inserted into the call-back number field (at state S26).

In some embodiments, if the image function is inserted into the call-back number field, the background of the memory address shown by the image code is read, the color of the background is converted into a color according to the color code value, the color is attached to the message, and the display color of the received message is converted into a color according to another color code value. As a result, the SMS message is displayed on the display window in a format according to the provided format information provided (at state S27).

Referring to state S25, if it is determined that the format information is not inserted in the message (at state S25), the message is displayed as previously formatted in the receiving mobile terminal (at state S28) without any change in the message's configuration.

According to another embodiment of the present invention, the transmitting mobile terminal inserts format information including the color of the background into the call-back number field and thereafter transmits the format information in a state where the receiving mobile terminal sets the background of the displayed message. In some embodiments, the receiving mobile terminal converts the background color of the message as received so that it is suitable for displaying the textual portion of the message.

Referring to FIG. 6A, in a first scenario A, a color mobile terminal according to the present invention transmits a SMS message having format information to a conventional color mobile terminal. In this case, even though the color mobile terminal according to the present invention transmits the format information, the conventional color mobile terminal is not configured to recognize the format information in order to display the message accordingly. Thus, only the text message in monochrome format is displayed.

In a second scenario B, a color mobile terminal transmits a SMS message having format information to another color mobile terminal, according to the present invention. In this case, the SMS message displayed on the receiving terminal is the same as the message displayed on the transmitting color mobile terminal.

In another scenario C, a color mobile terminal transmits a SMS message having format information to another color mobile terminal, according to the present invention. In this case, the SMS message is displayed on the receiving terminal according to the formatting set on the receiving terminal. Since no format information is included, if the receiving terminal does not have a preset background image and color, then only the text of the SMS message is displayed.

Referring to FIG. 6B, in another scenario D, a color mobile terminal according to the present invention transmits a SMS message to another color mobile terminal having format information including textual formatting but not background information. In this case, the SMS message is displayed on the receiving terminal having the same text format and color as displayed on the transmitting color mobile terminal. The background or the color of the background displayed in the receiving terminal remains the same.

In another scenario E, a color mobile terminal transmits to another color mobile terminal, according to the present invention, a SMS message having format information including background formatting information. In this case, the SMS message with the same background as the background displayed on the transmitting color mobile terminal is displayed on the receiving terminal. The text format of the SMS message, however, is set according to the receiving terminal.

In another scenario F, a color mobile terminal transmits to another color mobile terminal, according to the present invention, a SMS message, having format information including background and text formats. In this case, the SMS message with the same background as the background displayed on the transmitting color mobile terminal is displayed. If the background and text formatting and color are such that message information is not clearly displayed, then the receiving terminal automatically switches the text and background color and format to provide a visible contrast between the two, thereby providing a clear visual experience for the user.

As provided, secondary format information is included in a SMS message to complement the primary format of the message. If a receiving terminal is not equipped to read secondary format information or implement a message including the secondary format information accordingly, then the message is displayed using the primary formats. Also, if secondary format information is incomplete or fails to fully define all formatting features of a received message, then primary format information is utilized as a substitute.

According to the present invention, a service provider can provide color message transmission and reception services without changing transmission requirements or the primary formatting standards used. Because the primary SMS message format is maintained as it is, and since secondary format information is encoded into fields already present in the communication packet used to transmit the SMS message, the transmission and reception requirements need not be modified.

As such, new communication protocols or terminals for implementing the secondary format need not be developed. Thus, it is possible to meet the needs of new generation consumers by providing the message transmission and reception services using various colors. It will be apparent to those skilled in the art that various modifications to and variations of the present invention can be made. Thus, it is intended that the present invention covers the modifications and variations of this invention that are within the scope of the appended claims and their equivalents.

What is claimed is:

1. A method for communicating a message using a mobile terminal operable in a wireless communication system, the method comprising:

composing a message comprising text and format data, wherein the format data includes a format code corresponding to a background of a terminal display on which the message is to be displayed, and a color code corresponding to color for displaying the text;

encoding the message with the format data for wireless transmission; and transmitting the message to a base station operatively connected to a message center that is configured to process the message, wherein the message is intended to be received by a remote terminal capable of decoding the text and the format data, wherein the message comprises a multimedia message.

2. The method of claim 1, wherein the message is composed using various colors, and the color code corresponds to the various colors.

3. The method of claim 1, wherein the message is composed using at least one of various colors and images, and the format data further includes format code corresponding to a selected image which is transmitted with the message to the message center.

4. The method of claim 1, wherein the remote terminal retrieves the message from the message center by wirelessly communicating with the base station.

5. The method of claim 1, wherein the format code corresponds to a background image associated with the text.

6. The method of claim 1, wherein the format code corresponds to background color associated with the text.

7. The method of claim 1, wherein the color code corresponds to foreground color associated with the text.

8. The method of claim 1, wherein the format data further includes:
a format code corresponding to formatting attributes of the text.

9. The method of claim 1, wherein the color of the text is selected from a color code table accessible by a user.

10. The method according to claim 1, further comprising:
storing the message, prior to the transmitting, in memory associated with the mobile terminal.

11. The method according to claim 1, further comprising:
storing the text and the format data in separate locations in memory associated with the mobile terminal.

12. The method according to claim 1, further comprising:
displaying the text on a display associated with the mobile terminal, wherein the text is displayed in a color defined by the color code and on a background defined by the format code.

13. The method according to claim 1, further comprising:
automatically defining the color code of the message as a color which contrasts the background.

14. An internal memory of a mobile terminal for storing logic code for controlling an embedded system to communicate a message,
wherein the logic code comprises executable instructions for causing the embedded system to:
compose a message comprising text and format data, wherein the format data includes a format code corresponding to a background of a terminal display on which the message is to be displayed, and a color code corresponding to color for displaying the text;
encode the message with the format data for wireless transmission; and
transmit the message to a base station operatively connected to a message center that is configured to process the message,
wherein the message comprises a multimedia message.

15. The internal memory of claim 14, wherein the message is composed using various colors, and the color code corresponds to the various colors.

16. The internal memory 14, wherein the message is composed using at least one of various colors and images, and the format data further includes format code corresponding to a selected image which is transmitted with the message to the message center.

17. The internal memory of claim 14, wherein the format code corresponds to a background image associated with the text.

18. The internal memory of claim 14, wherein the format code corresponds to background color associated with the text.

19. The internal memory of claim 14, wherein the color code corresponds to fore ground color associated with the text.

20. The internal memory of claim 14, wherein the format data further includes.

a format code corresponding to formatting attributes of the text.

21. A method for receiving wireless messages from a mobile terminal, comprising:
receiving a message comprising text and format data, wherein the format data includes a format code corresponding to a background of a terminal display on which the message is to be displayed, and a color code corresponding to color for displaying the text; and
communicating the message to a message center that is configured to process the message,
wherein the message comprises a multimedia message.

22. The method of claim 21, wherein the message is composed using various colors, and the color code corresponds to the various colors.

23. The method of claim 21, wherein the message is composed using at least one of various colors and images, and the format data further includes format code corresponding to a selected image which is transmitted with the message to the message center.

24. The method of claim 21, further comprising:
retrieving the message from the message center; and
transmitting the retrieved message to a remote terminal capable of decoding the text and the background.

25. The method of claim 21, wherein the format code corresponds to a background image associated with the text.

26. The method of claim 21, wherein the format code corresponds to background color associated with the text.

27. The method of claim 21, wherein the color code corresponds to foreground color associated with the text.

28. The method of claim 21, wherein the format data further includes:
a format code corresponding to formatting attributes of the text.

29. A mobile terminal, comprising:
memory for storing a composed message comprising text and format data, wherein the format data includes a format code corresponding to of a terminal display on which the message is to be displayed, and a color code corresponding to color for displaying the text;
an encoder for encoding the message with the format data for wireless transmission; and
a transmitter for transmitting the message to a base station operatively connected to a message center that is configured to process the message,
wherein the message comprises a multimedia message.

30. The mobile terminal of claim 29, wherein the message is composed using various colors, and the color code corresponds to the various colors.

31. The mobile terminal of claim 29, wherein the message is composed using at least one of various colors and images, and the format data further includes format code corresponding to a selected image which is transmitted with the message to the message center.

32. The mobile terminal of claim 29, wherein the format code corresponds to a background image associated with the text.

33. The mobile terminal of claim 29, wherein the format code corresponds to background color associated with the text.

34. The mobile terminal of claim 29, wherein the color code corresponds to foreground color associated with the text.

35. The mobile terminal of claim 29, wherein the format data further includes:
a format code corresponding to formatting attributes of the text.

36. The mobile terminal of claim 29, wherein the color of the text is selected from a color code table accessible by a user.

37. A system for receiving wireless messages from a mobile terminal, the system comprising:
- a receiver configured to receive a message from the mobile terminal, wherein the message comprises text and format data, and wherein the format data includes a format code corresponding to a background of a terminal display on which the message is to be displayed, and a color code corresponding to color for displaying the text; and
- a communication link for communicating the message to a message center configured to process the message, wherein the message comprises a multimedia message.

38. The system of claim 37, further comprising:
a message center configured to receive the message from the receiver.

39. The system of claim 37, wherein the message is composed using various colors, and the color code corresponds to the various colors.

40. The system of claim 37, wherein the message is composed using at least one of various colors and images, and the format data further includes format code corresponding to a selected image.

41. The system of claim 37, further comprising:
a transmitter configured to receive the message from the message center and transmit the received message to a remote terminal capable of decoding the text and the background.

42. The system of claim 37, wherein the formal code corresponds to a background image associated with the text.

43. The system of claim 37, wherein the format code corresponds to background color associated with the text.

44. The system of claim 37, wherein the color code corresponds to foreground color associated with the text.

45. The system of claim 37, wherein the format data further includes:
a format code corresponding to formatting attributes of the text.

* * * * *